F. D. LAMBERT & R. R. RESCH.
ROTARY ENGINE.
APPLICATION FILED JUNE 29, 1910.
1,001,204.
Patented Aug. 22, 1911.
4 SHEETS—SHEET 1.
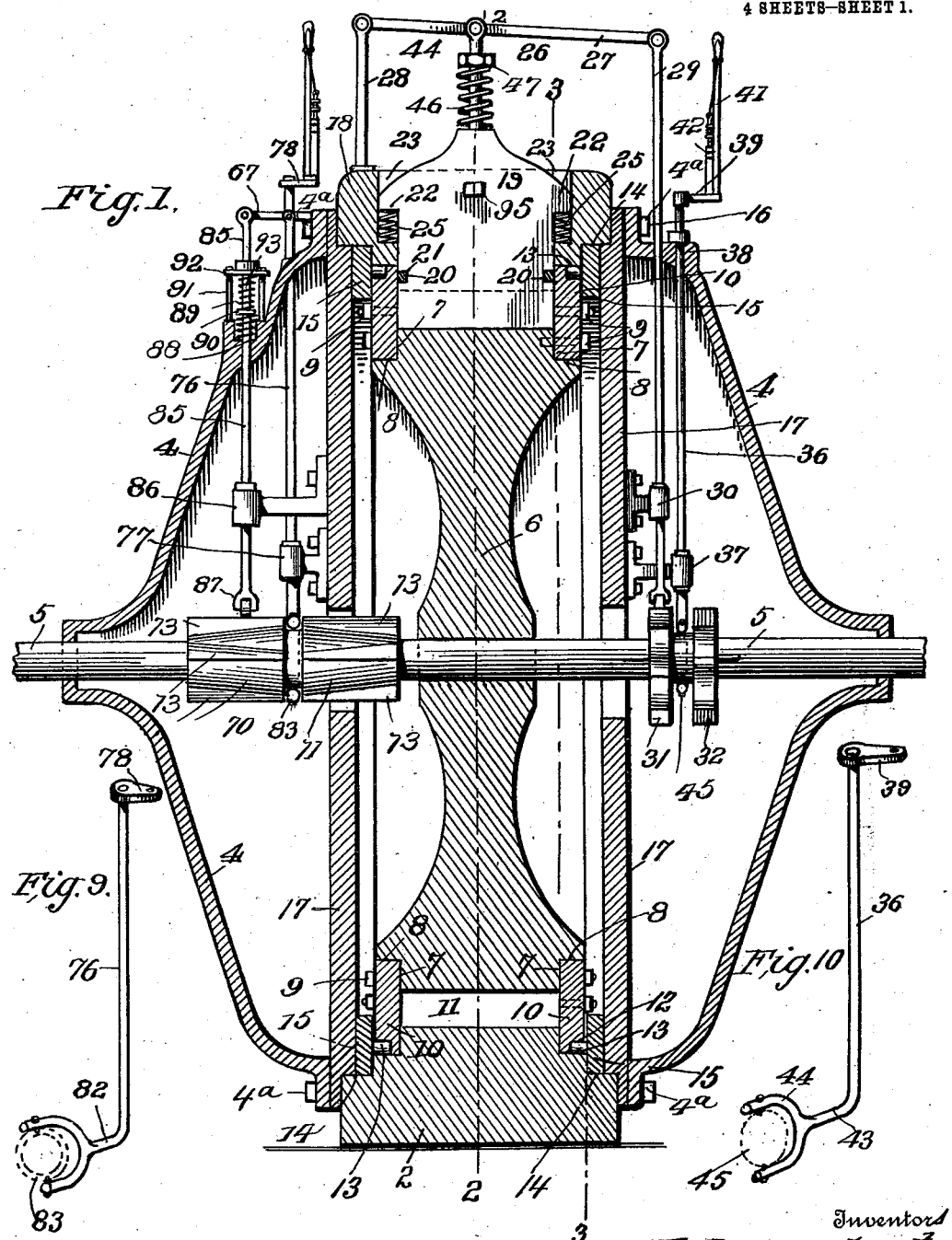
Witnesses
Inventors
F. D. Lambert
R. R. Resch
By
Attorneys

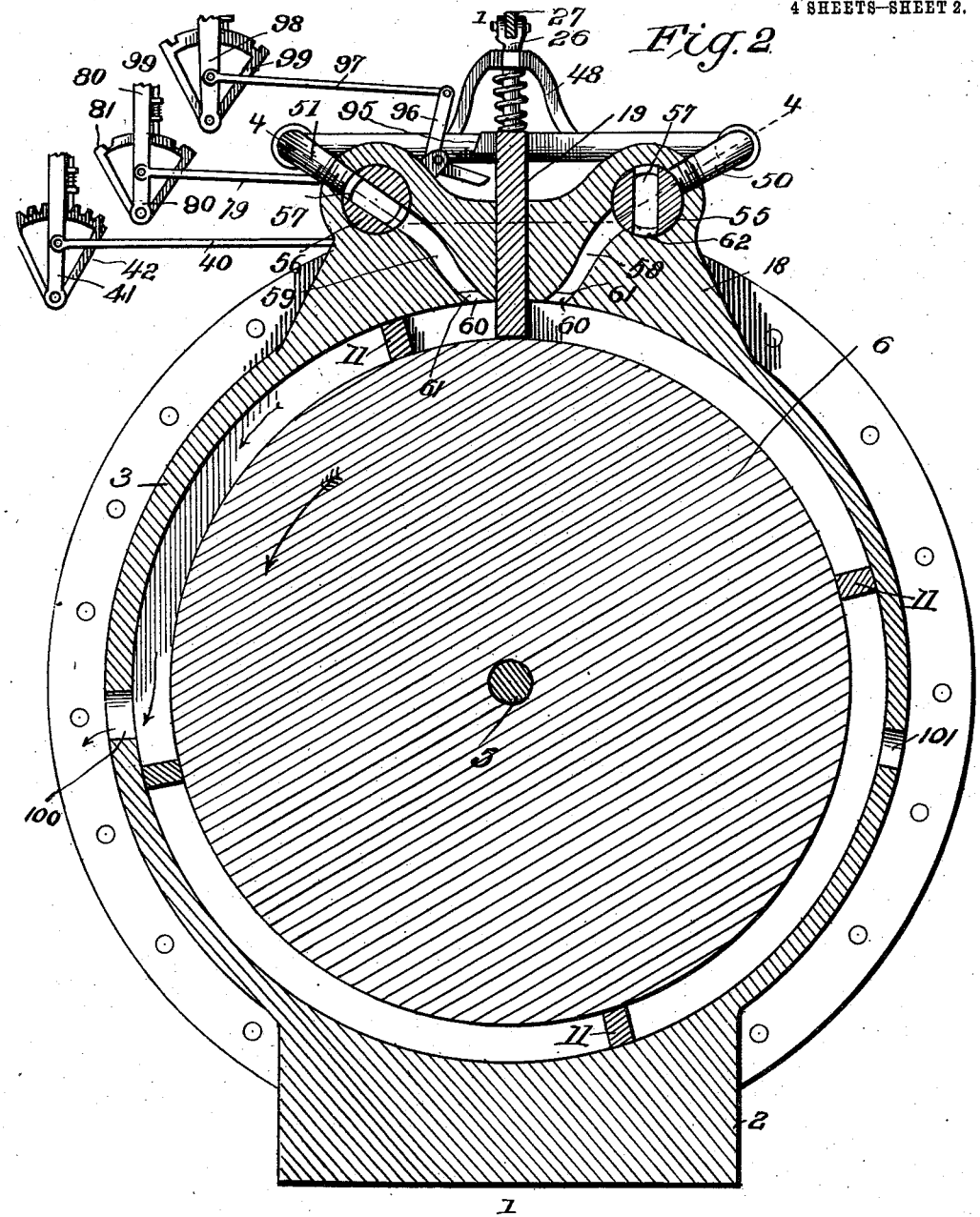

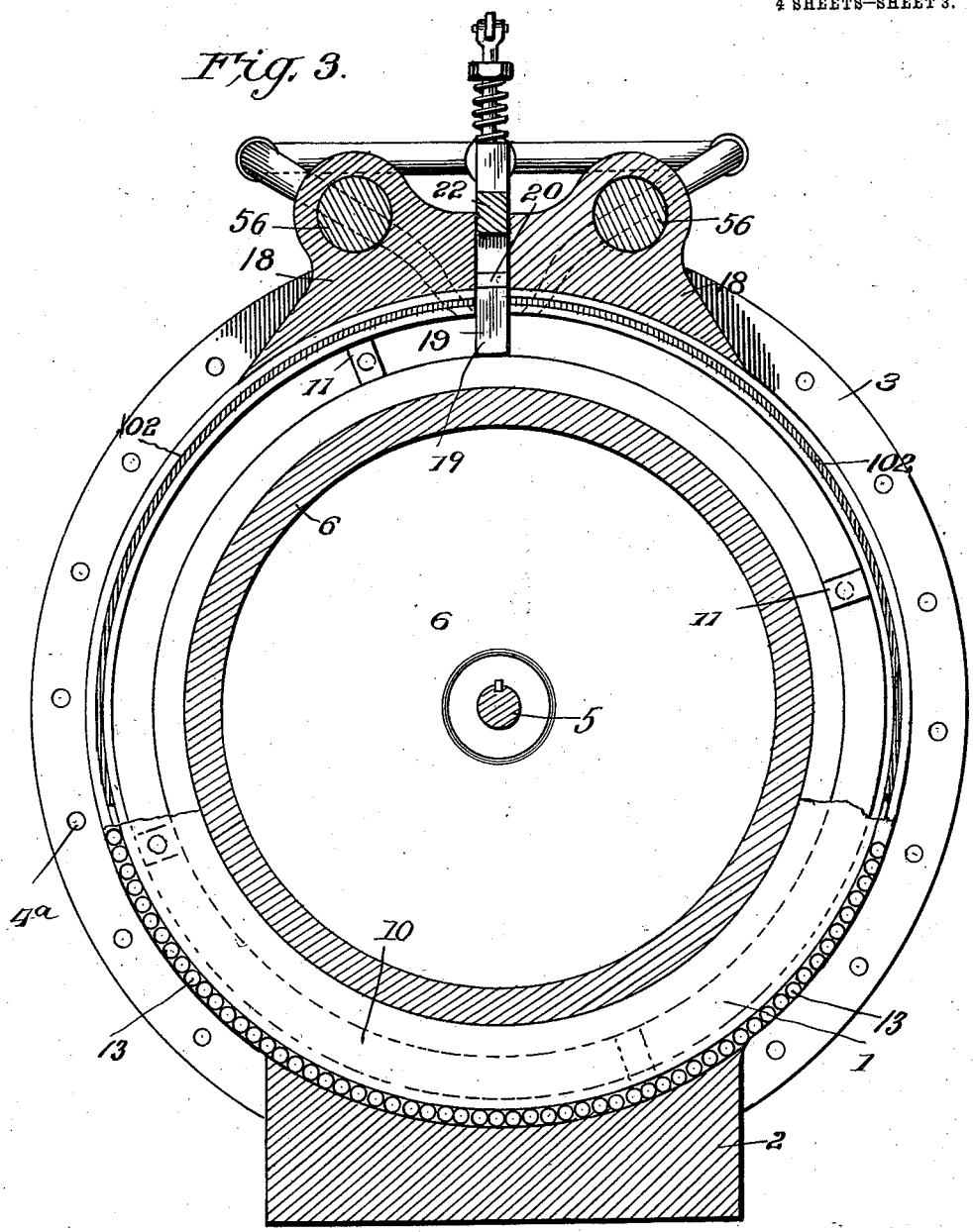

F. D. LAMBERT & R. R. RESCH.
ROTARY ENGINE.
APPLICATION FILED JUNE 29, 1910.
1,001,204.
Patented Aug. 22, 1911.
4 SHEETS—SHEET 4.
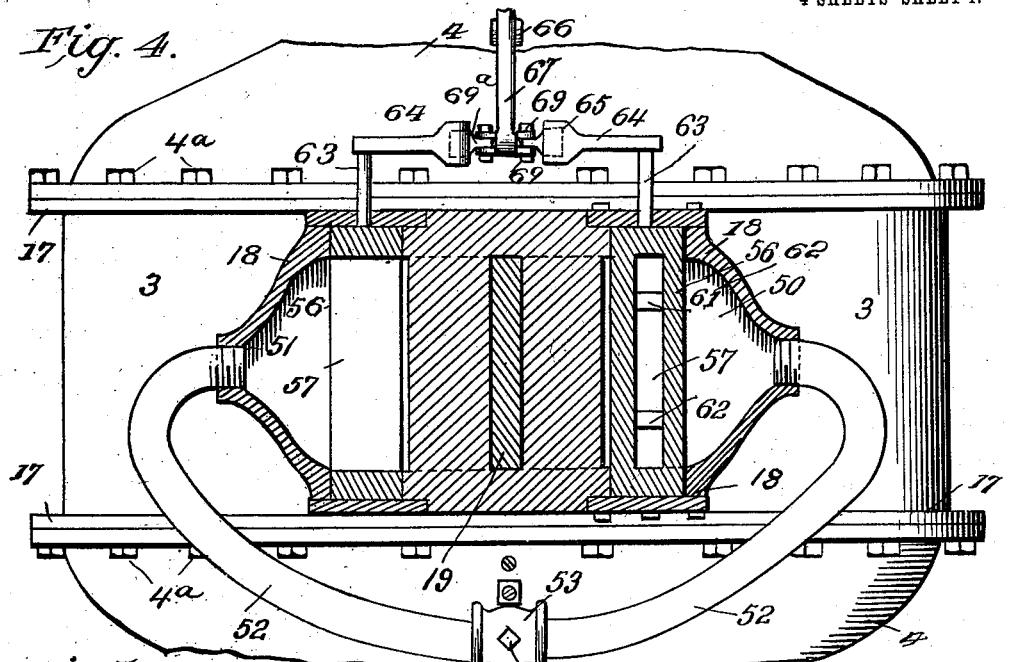
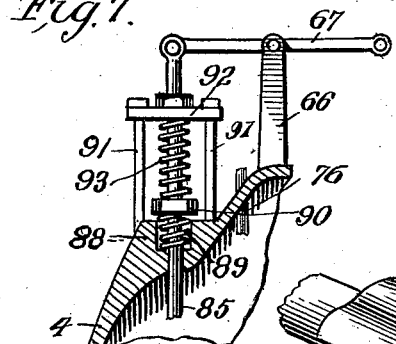
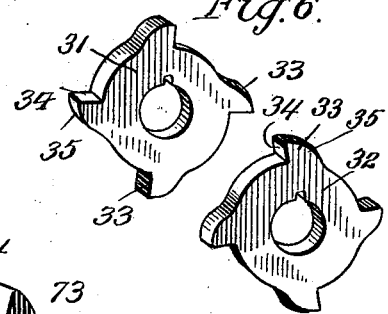
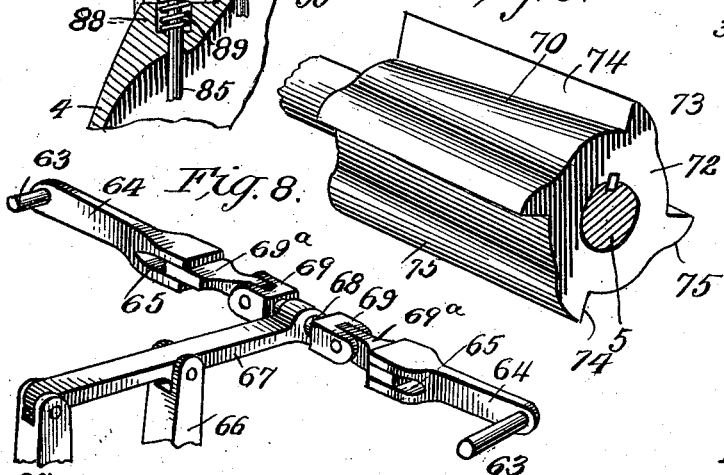
Witnesses
Inventors
F. D. Lambert
R. R. Resch
By
Attorneys
COLUMBIA PLANOGRAPH CO., WASHINGTON, D. C.

UNITED STATES PATENT OFFICE.

FLOYD D. LAMBERT AND RALPH R. RESCH, OF TRINIDAD, COLORADO.

ROTARY ENGINE.

1,001,204.  Specification of Letters Patent.  Patented Aug. 22, 1911.

Application filed June 29, 1910. Serial No. 569,574.

*To all whom it may concern:*

Be it known that we, FLOYD D. LAMBERT and RALPH R. RESCH, citizens of the United States, residing at Trinidad, in the county of Las Animas and State of Colorado, have invented certain new and useful Improvements in Rotary Engines, of which the following is a specification.

This invention relates to rotary engines of that type in which a rotor is mounted within a circular casing, the rotor being provided at intervals with outwardly projecting blades, the casing being provided at one point in its circumference with a spring-pressed abutment or valve which lifts to permit the passage of each of the blades of the rotor, and which immediately after the passage, is depressed into contact with the face of the rotor, means being provided whereby steam may be admitted on either side of the abutment to act upon the blades of the rotor.

The primary object of our invention is to provide a rotary engine of this character in which a very long period of expansion may be secured and compression practically done away with, and further in which the engine shall be perfectly counterbalanced.

A further object is to provide means whereby the action of the cut-off valves may be regulated so as to admit more or less steam to the engine, or to cut off later or earlier in the cycle.

A further object is to provide means whereby the engine may be easily reversed in its action, and to provide means whereby the abutment or valve may be raised entirely from engagement with a rotor when the engine is drifting.

Other objects and advantages will be set forth more fully in the course of this description.

For a full understanding of the invention and the merits thereof, and to acquire a knowledge of the details of construction, reference is to be had to the following description and accompanying drawings, in which:

Figure 1 is a vertical section of our improved rotary engine on the line 1—1 of Fig. 2. Fig. 2 is a vertical section transverse to the section shown in Fig. 1 on the line 2—2 of Fig. 1. Fig. 3 is a vertical section on the line 3—3 of Fig. 1. Fig. 4 is a plan view partly in section, the valve mechanism being cut away on the line 4—4 of Fig. 2. Fig. 5 is a detail perspective view of one of the cut-off valve-actuating cams. Fig. 6 is a detail perspective view of the cams for actuating the abutment. Fig. 7 is a detail side elevation partly in section of the means for supporting the valve-actuating rods. Fig. 8 is a perspective detail view of the means for operating the cut-off valves. Fig. 9 is a perspective view of the shifting means for the cams 70 and 71; and Fig. 10 is a like view of the means for shifting the cams 31 and 32.

Referring to these drawings 2 designates a base of any suitable construction upon which the engine is mounted, and 3 designates a cylindrical casing mounted upon the base and forming the inclosure within which the rotor operates. Attached to the casing 3 are the oppositely disposed annular plates 4 which at their centers are provided with bearings for the rotor shaft 5. These plates 4 are bolted by bolts $4^a$ to the casing 3. Passing through the bearings on the plates 4 and supported in any suitable manner, is the shaft 5 which carries upon it the rotor 6. This rotor is fast on the shaft 5, and its circumference is cut away at its side edges as at 7, thus forming annular supporting shoulders 8. The circumference of the rotor is provided with a plurality of laterally extending stud bolts 9, whereby the oppositely disposed ring plates 10 are attached to the rotor, the stud bolts 9 passing through the ring plates, as will be seen in Fig. 1, thus bolting the plates solidly into place against the shoulders formed by the cut away portions of the circumference of the rotor. Bolted between the plates 10 and resting upon the outer face of the rotor, are a plurality of blades 11, these blades not extending to the peripheries of the ring plates 10 so that the annular plates 10 project beyond the outer edges of the blades 11, as shown in Fig. 1. Each of the plates 10 is cut away upon its outer face as at 12, and journaled in this annular recess so formed are the antifriction rollers 13 which bear against the inner face of the outer casing 3. The outer casing is shouldered as at 14 and fitting snugly against the shoulder 14 thus formed, are the oppositely disposed ring plates 15. These ring plates extend inward beyond the inner face of the casing 3 and overlap the ring plates 10 so as to form a steam-tight joint between the annular plates 10 and the annular plates 15. This is most clearly shown at the lower part of Fig. 1. Attached to the cylindrical casing 3 in any suitable manner, as by the bolts 4ª which hold the side plates 4 to the outer casing 3, are the vertical side plates 17 which are annular in form, and through which passes the shaft 5, the side plates having an opening at the centers thereof considerably larger than the shaft 5, for a purpose to be later described.

It is to be noted that when it is desired to observe the condition of the rotor and the blades thereon, or to replace packing, etc., it is only necessary to remove the bolts 4ª whereupon the end casing 3 may be shifted laterally, the plates 17 also shifted laterally, (the rods 17 and 36 or 86 and 75 being disconnected) and that then the ring plate 15 may be easily removed, thus permitting the adjacent ring plate 10 to be also removed or the rotor itself to be entirely taken out.

Mounted upon the upper portion of the cylindrical casing 3 is the valve chest 18, as shown in Figs. 2 and 3, and passing downward through this valve chest and extending therein transversely to the direction of movement of the rotor, is the abutment or valve 19, the side edges of which are provided with packing recesses 20, as shown in Fig. 1, in which are located the packing strips 21. The upper portion of the abutment 19 has the outwardly projecting shoulders 22 at its ends, the upper portion of the valve chamber through which the abutment moves being also widened as at 23 to accommodate these shoulders. Between the shoulders 22 and the lower ends of the cut away portions 23 of the valve casing are located the springs 25 which exert an upward force on the abutment.

It will be obvious that as the blade 11 nears the abutment 19 that the abutment must be raised, and that after the blade has passed the abutment 19 the abutment must be lowered. To this end we have provided the abutment with an upwardly projecting spindle 26 which is pivoted to an arm or lever 27 mounted at one end upon a standard 28 projecting upward from the rotor casing, the free end of the lever 27 being pivoted to a downwardly extending rod 29 moving in a guide 30 attached to the side plate 17. The lower end of this rod 29 engages with one or the other of a couple of cams 31 and 32, both cams being exactly alike in construction but being reversed in position. These cams 31 and 32 are laterally shiftable upon the shaft 5 so as to bring either one of the cams 31 or 32 beneath the abutment operating rod 29. It will be seen from Fig. 6 that the members 31 and 32 are provided with the outwardly projecting spaced lugs 33, one face 34 of each lug being radial, while the other face 35 is inclined. Hence as the shaft 5 is rotated the cam lugs 33 will successively contact with the lower end of the operating rod 29 and will act to reciprocate the same. It will, of course, be understood that there are as many of the cam lugs 33 as there are blades on the rotor, and that these cam lugs are set slightly in advance of the blades of the rotor so that the abutment may be raised just prior to the arrival of a blade beneath the abutment. It will also be plain that the lugs 33 must be of a width greater than the width of the blades so as to hold the abutment in its raised position while a blade is passing beneath it.

The members 31 and 32 are splined upon the shaft 5 and are laterally movable thereon by any suitable shifting mechanism, but preferably we use for this purpose the vertical shaft 36 rotatably mounted in the bearings 37 and 38, and carrying at one end a crank arm 39 connected by a link 40 to a lever 41 operating on a sector 42 and provided with a suitable latch for engaging the sector and holding the lever in any desired position thereon. The lower end of the shaft 36 is formed with an outwardly projecting arm 43 having the bifurcated portion 44 connected with a shipper ring 45 which surrounds the shaft 5 and is disposed between the two cam members 31 and 32. By rotating the shaft 36 it will be obvious that the cam members 31 and 32 may be shifted longitudinally along the shaft 5 so as to bring either one of the cam members into engagement with the lower end of the reciprocating rod 29.

Surrounding the spindle 26 of the abutment is a spring 46 which bears at its lower end against the enlarged portion of the abutment, and at its upper end bears against a collar 47 through which the spindle 26 moves. This collar 47 is supported upon the valve chest in any suitable manner, as by the legs 48. The action of this spring 46 is to depress the abutment 19 when it is released so as to force the abutment downward. The springs 25 are provided in order to cushion the shock of the descending abutment so that it shall not strike the face of the rotor with great force. The spring 46 is of course of greater strength than the springs 25.

As shown in Figs. 2 and 4, the valve chest is provided with oppositely disposed steam chests 50 and 51 which are connected by pipes 52 to a union 53 provided with a valve 54 from which extends a pipe to any source of live steam. The steam chests 50 and 51 are each provided with the rotatable valves 55 and 56, these valves having the diametrically extending steam passages 57. The valve chest inward of the valves 55 and 56 is provided with the steam passages 58 and 59 which lead downward toward the inside of the rotor casing and open by the steam ports 60 on each side of the abutment 19. In order to strengthen the steam ports they are preferably each provided with a plurality of bridges 61, and the opening 57 of the valve may be also formed with a plurality of bridges 61ª if desired, these bridges being for the purpose of strengthening the valve opening and the port opening so as to prevent any warping of the material and hold the parts in rigid relation to each other.

It will be obvious from Fig. 2 that when the valves 55 or 56 are turned to bring the passages 57 or 58 into alinement with the steam passages and valve chests, that steam will pass from the steam chests 50 or 51 into the passages 58 or 59, and so into the rotor casing on one or the other side of the abutment, depending upon which direction the rotor is moving. For the purpose of operating these valves 55 and 56 we preferably provide the following mechanism. Each of the valves is provided with a spindle 63 formed with a crank arm. These extend toward each other and are formed at their adjacent ends with the sockets 65. Mounted upon a standard 66 extending upward from the casing of the rotor, is a vertically reciprocating lever 67, whose inner end is pivoted to the reduced portion 68 of a yoke 69, the ends of this yoke being bifurcated to form opposed ears. Pivoted between the ears are plungers 69ª, the enlarged heads of which are received in the sockets 65 in the arms 64. It will be seen that upon a reciprocation of the lever 67 the arms 64 will be rotated in one direction and will thus turn the valves, and upon a movement of the lever in the opposite direction that the arm 64 will be normally rotated and rotate the spindle 63 in the opposite direction to that first described. An oscillating rotary motion will thus be communicated to the rotary valves, thus acting as will be seen from Fig. 2 to alternately open the valves and close them, and it will also be seen that the extent of the opening movement of the valve and the length of time during which it remains open or closed will depend upon the speed with which the lever 67 reciprocates, and upon the extent of the movement of the lever.

In order to secure a means for varying the extent and period of reciprocation of the valve operating lever 67 we provide the following mechanism. Mounted upon the shaft 5 and on the opposite side of the rotor 6 from the cams 31 and 32 are the oppositely disposed valve-operating cam members 70 and 71. These are preferably formed integral with each other and are splined upon the shaft 5 so as to slide laterally thereon.

Each of these valve-operating cams comprises a sleeve 72 which loosely surrounds the shaft 5, and which is formed with the radially projecting cam ribs 73. These cam ribs have each a straight face 74 and an inclined or cam face 75, and there are as many of these ribs 73 as there are blades upon the rotor. The ribs 73 do not extend parallel to the surface of the tapered sleeve 72 but are parallel with the shaft, and hence the ribs are inclined from one end to the other relatively to the sleeve as shown in Figs. 1 and 2, and the ribs upon the cam sleeves 70 are reversely disposed as regards this inclination to the ribs on the cam sleeves 71. In order to provide for shifting these valve-actuating cams to bring one or the other of the cam sleeves beneath the valve actuating rod we provide the vertically mounted shaft 76 which is supported in any suitable manner as upon a bearing 77 attached to the plate 17, and which projects out through a suitable bearing in the side plate 4. The upper end of this shaft 76 is provided with a crank arm 78 connected by a link 79 to a lever 80 moving over a sector 81 and provided with a latch whereby the lever may be held in any adjusted position. The lower end of the shaft 76 is provided with the outwardly extending arm 82 having a shipper ring 83 at its end which surrounds the sleeve 72 between the oppositely disposed cam ribs 73. By operating the lever 80 the shaft 76 is rotated and this in turn will shift the cam sleeves 70 and 71 in one direction or the other, the adjacent side plate 17 being cut away as at 84 for the purpose of permitting this shifting of the sleeves inward to bring the sleeve 70 beneath the valve-operating rod. The extremity of the lever 67 is pivotally connected to the vertically disposed operating rod 85 which passes through a suitable opening in the side of the plate 4 and extends down through a guide 86, and at its lower end is provided with a roller 87 adapted to contact with and be operated by the ribs 73. The rod 85 extends through a socket 88 formed on the side plate 4 and in this socket is contained a spring 89 which bears against the under side of a nut or collar 90 which is fast on the rod 85. Also mounted on the side plate 4 are the bolts 91 which support a plate 92, between which and the collar 90 is disposed a compression spring 93. It will be seen that the spring 93 resists the upward movement of the rod 85 and acts to force the rod downward and into contact with the cam ribs 73, while the spring 89 acts to cushion the downward movement of the rod 85 and prevent it striking the face of the sleeve 70 or 71 with too great force.

It is necessary when the engine is drifting and the steam is entirely cut off from the steam chests and from the rotor casing, that the abutment 19 be raised so that the rotor may move freely, and so that there may be no necessity of operating the rod 29. For this purpose we provide the abutment 19 with an outwardly projecting lug 95, see Fig. 2, and mounted upon the valve chest is the bell crank lever 96 whose free end is so disposed that when the bell crank lever is rotated in one direction it will lift against the lug 95, and thus lift the abutment 19 upward to such a position that its lower edge will clear the blades 11. The extremities of the bell crank lever 96 are connected by a link 97 to a lever 98 which is mounted upon a sector 99 and provided with a latch whereby the lever may be held in its adjusted position.

The operation of our invention is as follows. The valve 54 is turned to admit steam into one or the other of the branches 52, whereby the steam is conducted into one or the other of the steam chests 50 or 51, depending upon the direction of rotation of the rotor. The steam passes through one or the other of the valves 55 or 56, as for instance as shown in Fig. 2 through the valve 56, and is directed into the space between the adjacent blade 11 and the abutment 19. The steam acts upon the blade 11 to rotate the rotor through a certain distance and then the steam is cut off by the closing of the valve 56, and the steam acts expansively until the blade 11 has passed the exhaust port 100, through which the exhaust steam is forced by the next following blade. The exhaust ports 100 and 101 are so placed relatively to the ports 60 that while one blade of the rotor is taking steam the other blade of the rotor has just passed the exhaust port. Thus a port is always open in advance of a blade against which the steam is impinging, and thus there is no compression at any period of the cycle. The exhaust port 100 is of course used in connection with the valve 56, the rotor in this case moving in the direction of the arrow in Fig. 2. The exhaust port 101 is of course used in connection with the valve 55, and the rotor moves in an opposite direction to the arrow in Fig. 2. It will be obvious that it is particularly necessary to prevent any escape of steam between the rotor and the surrounding casing from the time the steam is admitted through the inlet ports to the time the steam escapes through the exhaust ports, and for this reason we have provided the upper portions of the casing on each side of the abutment 19 with the packing strips 102, shown particularly in Fig. 3. These packing strips extend from the abutment around to the exhaust port, there being packing strips on each side of the rotor. After the steam has been exhausted through the port 100 for instance, the blade continues its movement with the rotor, and as it again approaches the abutment 19 the proper cam lug 33 will act to lift the abutment, thus permitting the passage of the blade. As soon as the blade has passed the abutment, the abutment is forced downward and again into contact with the face of the rotor. If it is desired to alter the period of cut off of the cut-off valves, it is only necessary to shift the cam sleeves 70 or 71 along the shaft 5, thus if it is desired to keep the valve 56 open for a longer period of time, the sleeve 70 is so shifted as to bring the highest portions of its cam ribs 73 beneath the operating rod 85. If, however, it is desired to shorten the period of cut off, and hence permit of a greater expansion of steam, the cam sleeve 70 is shifted longitudinally so that its lowest portion is brought beneath the valve-operating rod 85, and the valve-operating rod is given only a very small reciprocation. The cam sleeve 70 is for the purpose of operating the valve rod 85 when the engine is turning in one direction; when, however, the engine is turning in the reverse direction, it is of course obvious that the other cam sleeve 71 must be used, on which the ribs 73 are reversely placed to the ribs 73 on the sleve 70. At each reciprocation of the rod 85 the lever 67 will be reciprocated, which in turn will act to rotatably oscillate the spindles 62, thus oscillating the valves as before described and alternately establishing and disestablishing connection between the steam chests 50 and 51 and the passages 58 and 59. It will of course be understood that when one of the steam chests 50 or 51 is filled with live steam, the other steam chest is empty and inoperative.

By the foregoing description it will be seen that we have provided an engine which comprising as it does, a rotor mounted on a shaft and moving in a casing entirely eliminates the shock and jar incident to the reciprocating engine. It will further be obvious that we have arranged a construction which is relatively simple, which may be easily operated to reverse the engine without the necessity of complicated reversing gears, and particularly an engine in which the movement of the cut-off valves may be changed and adjusted at any time so as to suit any desired circumstance of running. By our construction also compression is eliminated and thus there is nothing which causes the engine to vibrate and cause a jar or shock, as would be the case in a reciprocating engine. Further it is pointed out that our engine is entirely inclosed so that no dust can get to the moving parts or into the rotor. All of the rods which pass out of the outer casing 4 pass through stuffing boxes or like means for preventing the entrance of dust, and further the engine being closed as it is, is particularly safe. The side plates 4 of the casing may be provided with hand-holes whereby the internal parts such as the inclosed parts 70 and 71, or the cams 31 and 32 may be adjusted or repaired. Further by removing the side plates and then removing the plates 17, it is possible to easily remove the rings 10 for the purpose of regrinding them or adjusting the rollers 15 and providing the rings with fresh packing.

It will be entirely obvious that while we have shown in Fig. 5 the ribs 73 as having their edges parallel to the shaft, and the sleeve 70 as being tapered, that a like result could be secured by making the sleeve of uniform diameter throughout its extent and inclining the ribs 73. In the construction shown in Fig. 5 as the cam rotates the roller on the lower end of the rod 85 rides up the inclined face 75 of the cam rib and drops as it passes the crest of the rib, the extent of this drop and hence the extent of the downward movement of the rod 85 depending upon the position of the cam and the distance between the edge of the cam rib and the face of the sleeve. If the sleeve was of uniform diameter and the rib tapered it is obvious that the same result would be secured, the only difference being that instead of the rod descending a greater distance the rod would rise to a greater height. The extent of the valve movement, however, would be the same in both cases. We do not wish therefore to be limited to the precise construction of the cam sleeve and cam ribs illustrated in Fig. 5.

Having thus described the invention, what is claimed as new is:—

1. In a rotary engine, the combination with a casing and a rotor, said casing having an inlet opening, of a valve controlling the passage of fluid through said opening, a cam tapered from one end to the other and laterally movable, said cam having a plurality of laterally extending ribs the outer edges of which are parallel to the axis of the cam, the ribs on one side having an inclined face merging into the face of the cam and on the other side having faces radial to the cam, and a connection operated by said cam for operating said valve.

2. In a rotary engine, the combination with a casing and a rotor having a plurality of blades and said casing having an inlet opening, of a valve controlling the passage of fluid through said opening, parallel spaced cams mounted upon the shaft of the rotor, each of said cams being tapered from one end to the other, the cams being oppositely tapered with relation to each other, each of said cams being provided with a plurality of longitudinally extending ribs the outer edges of which are parallel to the axis of the cam, each rib having an inclined face and a face radial to the axis of the cam, the inclined faces of the ribs on one cam being oppositely disposed with relation to the inclined faces on the ribs of the other cam, means for simultaneously laterally shifting both of said cams upon the rotor shaft, and a connection operable by either of said cams for operating said valve.

3. In a rotary engine, the combination with a rotor and a casing inclosing the rotor, said casing having an inlet port, of a valve controlling the passage of fluid through said port, a shaft, a cam rotatable with said shaft, means for operating the valve engaging said cam, and means for shifting the cam longitudinally along the shaft, said cam being provided with a plurality of cam ribs extending longitudinally along the cam in the direction of the shaft, and each rib tapering from one end of the cam to the other.

4. In a rotary engine, a rotor, a shaft on which the rotor is mounted, a casing through which the shaft passes, having a channeled face within which the circumference of the rotor is received, blades on the rotor, a sliding abutment extending into the casing and contacting against the face of the rotor, a lever for vertically moving said abutment to lift it above the edge of the blades on the rotor, and a cam mounted on the shaft for operating said lever.

5. In a rotary engine, the combination with a rotor casing, of a sliding abutment extending into the rotor casing, a spring forming said abutment against the rotor, and oppositely disposed springs mounted on the casing and acting against the first named spring.

6. In a rotary engine, the combination with a rotor casing, of an abutment movable through the casing and against the periphery of the rotor, a lever operatively connected to reciprocate said abutment, a spring acting to hold the abutment against the face of the rotor, and oppositely disposed springs mounted in the casing beneath the rotor and absorbing the shock of the descent of the abutment.

7. In a rotary engine, a rotor, a casing surrounding the rotor, a sliding abutment mounted in the casing, means for reciprocating the sliding abutment, a spring acting to hold the sliding abutment into contact with the rotor, and oppositely disposed springs mounted in the casing beneath the sliding abutment, with which the abutment engages before it engages with the face of the rotor.

8. In a rotary engine, a rotor, a shaft on which the rotor is mounted, a casing surrounding the rotor, through which the shaft passes, a sliding abutment mounted in said casing to contact with the face of the rotor, a lever connected to the sliding abutment, a cam on the shaft, a connection between said cam and the lever, an adjustable spring for forcing the abutment into contact with the rotor face, and springs mounted upon the casing and engaging with the abutment as it moves toward the rotor face.

9. In a rotary engine, a bladed rotor, a casing inclosing the rotor, a shaft passing through the casing, on which the rotor is mounted, a sliding abutment carried in the casing, a spring for forcing said abutment into contact with the face of the rotor, a cam mounted on the shaft and having a plurality of cam faces, a lever for moving the abutment, a connection between said lever and said cam, a valve for controlling the inlet of motive fluid to the interior of the casing, a cam mounted on said shaft and having a plurality of cam faces, a connection between said cam and the valve, for operating the latter from the former, said cam being formed with a plurality of cam faces tapering from one end of the cam to the other, and means for shifting said cam longitudinally along the shaft.

10. In a rotary engine, a rotor, radial blades on the rotor, a shaft on which the rotor is mounted, a casing surrounding the rotor, a sliding abutment mounted in said casing to contact with the face of the rotor, means for lifting said abutment as each blade comes into proximity thereto, oppositely placed exhaust ports in the casing, oppositely disposed steam chests located on each side of the abutment and connected to a common source of steam supply, each of said steam chests having a port leading to the face of the rotor, rotatable valves mounted in said steam chests and controlling the passage of fluid through the port, spindles on the valves extending out of the steam chests and having crank arms, a vertically reciprocating lever disposed between said crank arms, links pivotally connected to the ends of said crank arms and to said lever, and means for vertically reciprocating the lever upon a rotation of the rotor shaft.

11. In a rotary engine, a rotor provided with blades, a casing inclosing the rotor, a shaft passing through the casing on which the rotor is mounted, a sliding abutment carried in the casing, a spring for forcing the abutment into contact with the face of the rotor, cams mounted on the shaft and having a plurality of cam faces, a lever for moving the abutment, a connection between said lever and said cams, steam chests disposed on each side of the abutment and connected to a common source of steam supply, rotary valves mounted in the steam chests and adapted to establish or cut off communication between the source of steam supply and the interior of the rotor, said valves having outwardly projecting spindles, crank arms on the spindles, a cam mounted on the rotor shaft and having a plurality of cam faces, a reciprocating lever, an operating rod bearing at one end against the cam faces and at the other end connected to said lever, and a plurality of links pivoted to each other and to the extremities of the crank arms on the valves.

12. In a rotary engine, a rotor, a cylindrical casing inclosing the rotor, a shaft on which the rotor is mounted, side plates attached to the casing and extending to the shaft and through which the shaft passes, a sliding abutment mounted in the casing, valves for directing motive fluid into the casing on either side of the abutment, and means mounted on the rotor shaft and inclosed between said side plates and the casing, whereby the abutment and the valves may be operated.

13. In a rotary engine, a rotor provided with blades, a casing surrounding the rotor, a sliding abutment mounted in the casing, means for reciprocating the sliding abutment, a spring acting to hold the abutment in contact with the rotor, means for reciprocating the abutment in order to permit the blades to pass it, and means for permanently raising the abutment out of contact with the rotor.

14. In a rotary engine, a bladed rotor, a casing surrounding the rotor, a sliding abutment mounted in the casing, means for reciprocating the abutment, a spring acting to hold the abutment into contact with the rotor, a bell crank lever normally out of engagement with the sliding abutment and engaging with the same to raise it to lift the abutment out of engagement with the rotor, and an operating lever connected to said bell crank lever whereby the latter may be moved to raise the abutment.

15. In a rotary engine, a rotor, a casing surrounding the rotor, blades on the rotor, annular ring plates attached to the rotor at each end of the blades and projecting up beyond the blades and against the face of the casing, and annular ring plates attached to the casing and overlapping the ring plates on the rotor.

16. In a rotary engine, a cylindrical casing, a rotor mounted within the casing and having blades thereon, oppositely disposed ring plates mounted on the rotor at each end of the blades and extending outward beyond the blades, rollers mounted in the outer edges of said ring plates and contacting with the inner face of the casing, and ring plates mounted on the casing exterior to the ring plates of the rotor and extending inward and overlapping the same.

17. In a rotary engine, a shaft, a rotor mounted on the shaft, the peripheral face of the rotor being formed on opposite sides with annular shoulders, ring plates mounted on said shoulders and extending outward therefrom, blades on the face of the rotor of less depth than the ring plates and clamped between the same, rollers mounted in the edge of the ring plates, a casing surrounding the rotor having oppositely disposed, lateral recesses in which the ring plates of the rotor project, and oppositely
5 disposed ring plates mounted on the casing on each side of the ring plates of the rotor and overlapping the same.

In testimony whereof, we affix our signatures in presence of two witnesses.

FLOYD D. LAMBERT. [L. S.]
RALPH R. RESCH. [L. S.]

Witnesses:
M. L. CLARK,
T. S. McCHESNEY.

---

Copies of this patent may be obtained for five cents each, by addressing the "Commissioner of Patents, Washington, D. C."